United States Patent [19]

Kijima et al.

[11] Patent Number: 4,715,615

[45] Date of Patent: Dec. 29, 1987

[54] VEHICLE REAR-SUSPENSION SYSTEM

[75] Inventors: Takao Kijima; Fumitaka Ando, both of Hiroshima, Japan

[73] Assignee: Mazda Motor Corporation, Japan

[21] Appl. No.: 632,648

[22] Filed: Jul. 20, 1984

[30] Foreign Application Priority Data

Jul. 27, 1983 [JP] Japan ................... 58-138528
Jul. 27, 1983 [JP] Japan ................... 58-138533

[51] Int. Cl.$^4$ ..................... B60G 3/26; B60G 7/02
[52] U.S. Cl. ..................... 280/701; 267/248; 280/690
[58] Field of Search .......... 280/701, 689, 690, 688, 280/710; 180/73.3, 73.1; 267/20 R

[56] References Cited

U.S. PATENT DOCUMENTS

| 3,333,654 | 8/1967 | Price-Stephens | 180/73.1 |
|---|---|---|---|
| 3,586,346 | 6/1971 | Sautter | 280/688 |
| 3,891,232 | 6/1975 | Flemming | 280/701 |
| 4,421,332 | 12/1983 | Kosak et al. | 280/701 X |
| 4,440,419 | 4/1984 | Kosak et al. | 280/701 X |
| 4,444,415 | 4/1984 | von der Ohe | 280/690 V |
| 4,491,341 | 1/1985 | Maebayashi | 280/688 |
| 4,537,420 | 8/1985 | Ito et al. | 280/690 X |

FOREIGN PATENT DOCUMENTS

| 70025 | 1/1983 | European Pat. Off. | 280/701 |
|---|---|---|---|
| 1530742 | 5/1969 | Fed. Rep. of Germany | 280/701 |
| 1937320 | 2/1971 | Fed. Rep. of Germany | 280/690 |
| 2729962 | 1/1979 | Fed. Rep. of Germany | 280/690 |
| 12814 | 1/1983 | Japan | 280/701 |
| 12811 | 1/1983 | Japan | 280/690 |

OTHER PUBLICATIONS

Japanese unexamined patent publication No. 58(1983)-12811.

*Primary Examiner*—John J. Love
*Assistant Examiner*—Mitchell J. Hill
*Attorney, Agent, or Firm*—Gerald J. Ferguson, Jr.; Michael P. Hoffmann; Michael J. Foycik, Jr.

[57] ABSTRACT

A trailing arm type rear-suspension system having a trailing arm which is connected to a wheel hub for supporting a rear wheel for rotation at one end and to the vehicle body for vertical pivotal movement at the other end by way of a resilient bushing is provided with a camber control link mechanism. The camber control link mechanism comprises first and second control links. The first control link is fixed to the trailing arm at its first end. The second control link is connected to a second end of the first control link for pivotal movement at one end, and to the vehicle body for pivotal movement at the other end. The pivotal center of the second control link on the vehicle body is offset from the pivotal axis of the trailing arm by a preset amount so that the path along which the junction point between the first and second control links is to move when it pivots about the pivotal axis of the trailing arm differs from the path along which it is to move when it pivots about the pivotal center of the second control link on the vehicle body.

11 Claims, 9 Drawing Figures

VEHICLE REAR-SUSPENSION SYSTEM

BACKGROUND OF THE INVENTION

Field of the Invention

This invention relates to a rear-suspension system for a vehicle, and more particularly to a trailing arm type rear-suspension system for a vehicle including semi-trailing arm type and full-training arm type rear-suspension systems.

DESCRIPTION OF THE PRIOR ART

In Japanese Unexamined Patent Publication No. 58(1983)-12811, there is disclosed a trailing arm type rear-suspension system for a vehicle which is arranged to cause the rear wheel to toe in when a lateral force is exerted thereon, and comprises a semi-trailing arm which supports the rear wheel for rotation and is connected for pivotal movement in a vertical plane to the vehicle body by way of a pair of resilient bushings at a pair of points, and an assist link one end of which is connected for pivotal movement to the semi-trailing arm at a position on the rear side of the wheel support portion of the semi-trailing arm, and the other end of which is connected for pivotal movement to the vehicle body.

As is well known, it is desired that the camber of the rear wheels be controlled according to the running condition of the vehicle from the viewpoint of driving stability. For example, by keeping the amount of camber of the rear wheels at a proper negative value throughout bump during cornering, the driving stability during cornering can be improved. Further, when the rear tires hit upon bumps or rebound during straight travel at a high speed on rough roads, the driving stability can be ensured by limiting change in the amount of camber of the rear wheels.

In conventional full-trailing arm type rear-suspension systems, the camber of the rear wheels does not change during bump or rebound, and in conventional semi-trailing arm type rear-suspension systems, the camber of the rear wheels changes solely depending upon inclination of the pivotal axis of the semi-trailing arm and the change in the amount of camber increases with increase in the amount of bump. Thus there has been developed no rear-suspension system for a vehicle in which the chamber of the rear wheels can be controlled according to the running condition of the vehicle.

SUMMARY OF THE INVENTION

In view of the foregoing observations and description, the primary object of the present invention is to provide an improved rear-suspension system in which the camber of the rear wheels can be controlled according to the running condition of the vehicle, thereby ensuring driving stability.

Another object of the present invention is to provide an improved rear-suspension system which is simple in structure and can improve the driving stability of the vehicle especially during cornering.

Still another object of the present invention is to provide an improved rear-suspension system in which change in the amount of camber during straight travel is minimized, whereby stability of the vehicle during straight travel can be substantially improved.

In accordance with the present invention, a trailing arm type rear-suspension system having a trailing arm which is connected to a wheel hub for supporting a rear wheel for rotation at one end and to the vehicle body for vertical pivotal movement at the other end by way of a resilient bushing is provided with a camber control link mechanism comprising a first control link fixed to the trailing arm at its first end and a second control link which is connected to a second end of the first control link for pivotal movement at one end and to the vehicle body for pivotal movement at the other end, the pivotal center of the second control link on the vehicle body or the body side pivotal center of the second control link being offset from the pivotal axis of the trailing arm by a preset amount.

When the body side pivotal center of the control link is offset from the pivotal axis of the trailing arm, the path along which the junction point between the first control link and the second control link is to move when it pivots about the pivotal axis of the trailing arm differs from the path along which it is to move when it pivots about the body side pivotal center of the second control link. By this difference between the paths, change in the amount of camber of the rear wheel during bump or rebound is controlled.

The rear-suspension system in accordance with one aspect of the present invention comprises a trailing arm which is connected to a wheel hub for supporting a rear wheel for rotation at one end and to the vehicle body for vertical pivotal movement at the other end by way of a resilient bushing, a first control link fixed to the trailing arm at its first end and a second control link which is connected to a second end of the first control link for pivotal movement at one end and to the vehicle body for pivotal movement at the other end, the second control link being disposed to vertically extend on the forward side of the vertical plane including the pivotal axis of the trailing arm and the body side pivotal center of the second control link being offset from the pivotal axis of the trailing arm by a preset amount.

In accordance with another aspect of the present invention, the rear-suspension system comprises a trailing arm which is connected to a wheel hub for supporting a rear wheel for rotation at one end and to the vehicle body for vertical movement at a single point on the other end by way of a resilient bushing, a lateral link one end of which is connected to the vehicle body for pivotal movement in a position on the inner side (with respect to the vehicle body) of the body side mounting point of the trailing arm, i.e., said single point of said the other end of the trailing arm, and the other end of which is connected to the trailing arm for pivotal movement, a first control link fixed to the trailing arm at its first end, and a second control link which is connected to a second end of the first control link for pivotal movement at one end and to the vehicle body for pivotal movement at the other end, the body side pivotal center of the second control link, i.e., said other end of the same, being offset from the line joining the body side mounting point of the trailing arm and the body side mounting point of the lateral link by a preset amount.

DESCRIPTION OF THE PREFERRED EMBODIMENT

FIGS. 1 to 4 show a semi-trailing arm type rear-suspension in accordance with an embodiment of the present invention. In FIGS. 1 to 4, the structure of the rear-suspension for the right rear wheel is illustrated. A semi-trailing arm 1 comprises a channel-like front member 11 and a cylindrical rear member 12 connected with each other, and extends substantially in the longitudinal direction of the vehicle body (not shown). The rear member 12 comprises a wheel hub support portion 121 which is cylindrical in shape and supports the wheel hub for the right rear wheel W, a connecting portion 122 which projects forwardly from the wheel hub support portion 121 and is connected to the rear end portion of the front member 11, a control link mounting portion 123 which extends forwardly inwardly from the connecting portion 122 and to which a first control link 31 is fixed at one end as will be described later, and a lateral link mounting portion 124 which inwardly projects from the connecting portion 122 near the rear end of the control link mounting portion 123 and to which a lateral link 2 is connected as will be described later. The front member 11 is fixedly connected with the connecting portion 122 of the rear member 12 by bolts 13 at its rear end portion. The front end portion of the front member 11 forming the front end portion of the semi-trailing arm 1 extends forwardly and is mounted on the vehicle body by way of a resilient bushing 14 to pivot up and down.

Said lateral link 2 is mounted for pivotal movement on the vehicle body at one end by way of a ball joint 21 in a position on the inner side (with respect to the vehicle body) of the body side mounting point of the semi-trailing arm 1, i.e., the resilient bushing 14, and is connected for pivotal movement to the lateral link mounting portion 124 of the semi-trailing arm 1 by way of a ball joint 22, thereby ensuring lateral rigidity against the lateral force acting on the rear wheel W.

The line joining the body side mounting point of the semi-trailing arm 1, i.e., the resilient bushing 14, and the body side mounting point of the lateral link 2, i.e., the ball joint 21, that is, the line which forms the pivotal axis l of the semi-trailing arm 1 is inclined with respect to the longitudinal axis of the vehicle body by a predetermined angle.

A camber control link mechanism 3 is disposed between the semi-trailing arm 1 and the lateral link 2, and comprises said first control link 31 and a second control link 32. The first control link 31 is fixed to said control link mounting portion 123 of the semi-trailing arm 1 at one end by means of a bolt 33. The other end of the first control link 31 is directed inwardly downwardly toward the front of the vehicle body. The second control link 32 is disposed to extend vertically. The lower end of the second control link 32 is connected for pivotal movement to said the other end or the front end of the first control link 31 by way of a ball joint 34, and the upper end of the second control link 32 is connected for pivotal movement to the vehicle body by way of a ball joint 35. The second control link 32 is shorter than the first control link 31. The ball joint 35 on which the second control link 32 pivots is disposed in a position offset from said pivotal axis l of the semi-trailing arm 1 by a preset amount e.

A vertically extending shock absorber 4 is connected at its lower end to a shock absorber support portion 125 which rearwardly projects from the wheel hub support portion 121 of the semi-trailing arm 1, and is connected to the vehicle body at its upper end. A coil spring 5 is disposed around the shock absorber 4. Reference numeral 6 denotes a rear axle shaft.

During bump (including bump during cornering) or rebound of the rear wheel W, the rear wheel W supported on the wheel hub vertically pivots with respect to the vehicle body under the guidance of both the semi-trailing arm 1 and the camber control link mechanism 3 comprising the first control link 31 fixed to the semi-trailing arm 1 at one end and the second control link 32 connected to the other end of the first control link 31. Because the body side pivotal center P of the camber control link mechanism 3, i.e., the ball joint 35, is offset by the preset amount e, from the pivotal axis l of the semi-trailing arm 1, the path $q_1$ along which the junction Q between the first and second control links 31 and 32, i.e., the ball joint 34, is to move when it pivots about the axis l differs from the path $q_2$ along which the junction Q is to move when it pivots about the body side pivotal center P. By this difference between the paths $q_1$ and $q_2$, change in the amount of camber during pivotal movement of the semi-trailing arm 1 is controlled. That is, the change in the amount of camber of the rear wheel W which would be obtained when the semi-trailing arm 1 pivots freely about the axis l is corrected by virtue of said difference in paths under resilient deformation of the resilient bushing 14 at which the semi-trailing arm 1 is mounted on the vehicle body, and the amount of correction depends upon the preset amount e by which the ball joint 35 is offset from the axis of pivotal movement of the semi-trailing arm 1.

Thus, upon bump during cornering, the camber is prevented from becoming positive or excessively negative, and is kept at an optimal value, whereby the driving stability during cornering is improved. For example, the camber is initially set at a negative optimal value and is kept at the optimal value by arranging the system so that the amount of camber is corrected toward positive during bump or rebound. Further, when the rear tire hits a bump or rebound during straight travel on rough roads, the change in the amount of camber of the rear wheel can be limited, thereby improving stability in straight travel. Further, by arranging the system so that the rear wheel W is tilted to have a nagative camber taking into account the difference in amount between bump during cornering and bump during straight travel on rough roads, the amount of camber during cornering can be kept at a proper value and at the same time, the change in the amount of camber during straight travel on rough roads can be limited.

Further, in the rear-suspension system of this embodiment, because the camber control upon bump and rebound is effected by way of resilient deformation of the resilient bushing 14 which is the sole mounting portion of the semi-trailing arm onto the vehicle body, the lateral rigidity against lateral force being ensured by the lateral link 2, it can be accomplished easily and smoothly. At the same time, since the lateral rigidity against lateral force is increased as compared with a semi-trailing arm mounted on the vehicle body at two points, by use of the lateral link 2, the driving stability and the running stability are further improved, and the vehicle body can be reduced in weight to a corresponding extent. In this connection, to arrange the camber control link mechanism 3 between the semi-trailing arm 1 and the lateral link 2 is advantageous in obtaining proper lateral rigidity by use of the lateral link 2.

The fact that change in the amount of camber can be controlled according to bump or rebound permits the position of the semi-trailing arm 1 and the inclination of the pivotal axis thereof to be freely selected not to interfere with the vehicle body, whereby the degree of freedom in disigning rear-suspensions can be increased.

In the above embodiment, the first control link 31 of the camber control link mechanism 3 is fixedly connected to the semi-trailing arm 1 at the control link mounting portion 123 which is near the wheel hub support portion 121, and the lateral link 2 is connected to the semi-trailing arm 1 near the control link mounting portion 123. This arrangement is advantageous in that the part of the semi-trailing arm 1 to which torsion is imparted by the camber control link mechanism 3 and the lateral link 2 can be reduced in length, whereby the torsional rigidity can be improved and the system can be reduced in weight to a corresponding extent. Further, in the above embodiment, the second control link 32 is arranged vertically and is shorter than the first control link 31. This permits the mounting point of the camber control link mechanism 3 to the vehicle body to be relatively high, which is advantageous in layout of the rear-suspension system and from the viewpoint of strength because the load placed on the second control link 32 is tension load.

Another embodiment of the present invention shown in FIGS. 5 to 8 is very similar to that shown in FIGS. 1 to 4, and accordingly analogous parts are given the same reference numerals. In this embodiment, it should be noted that the second control link 32 is disposed on the forward side of the vertical plane including the pivotal axis l of the semi-trailing arm 1 (FIG. 9), and the body side pivotal center P (the ball joint 35) is downwardly offset from the pivotal axis l of the semi-trailing arm 1 by a preset amount e.

Figure 1:
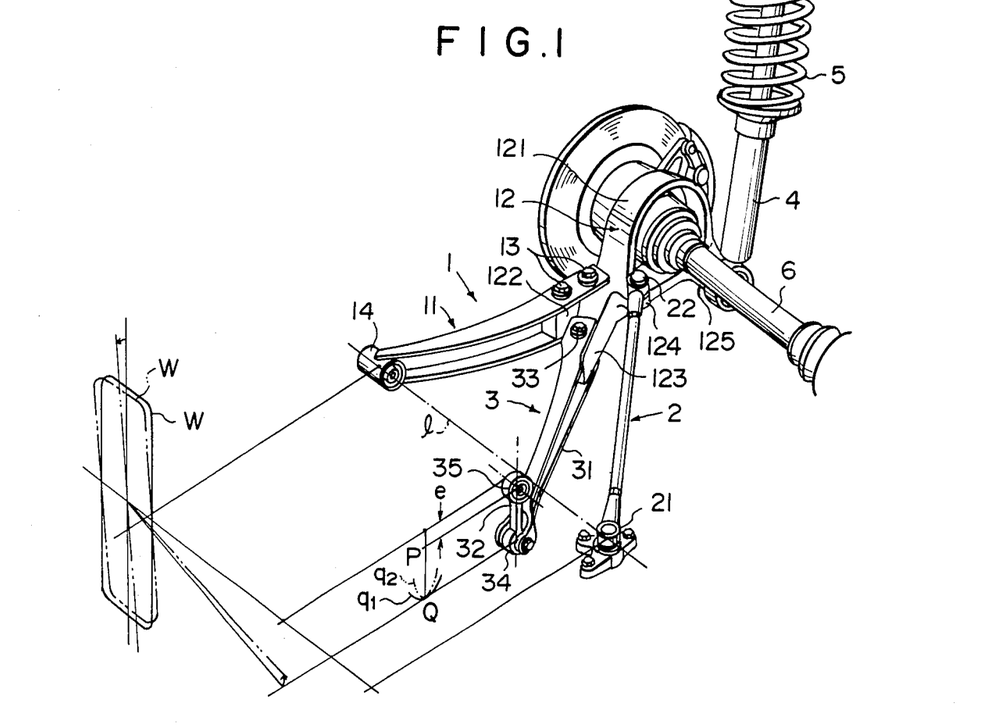
FIG. 1 is a schematic perspective view showing a part of a semi-trailing arm type rear-suspension system in accordance with an embodiment of the present invention.
Figure 2:
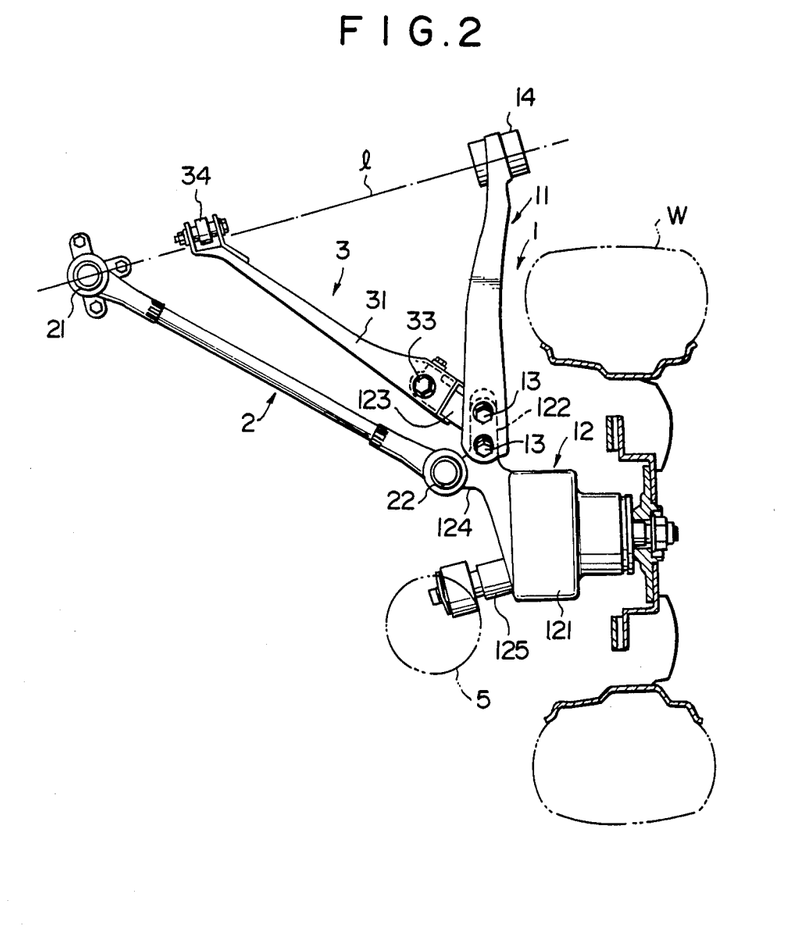
FIG. 2 is a plan view of FIG. 1.
Figure 3:
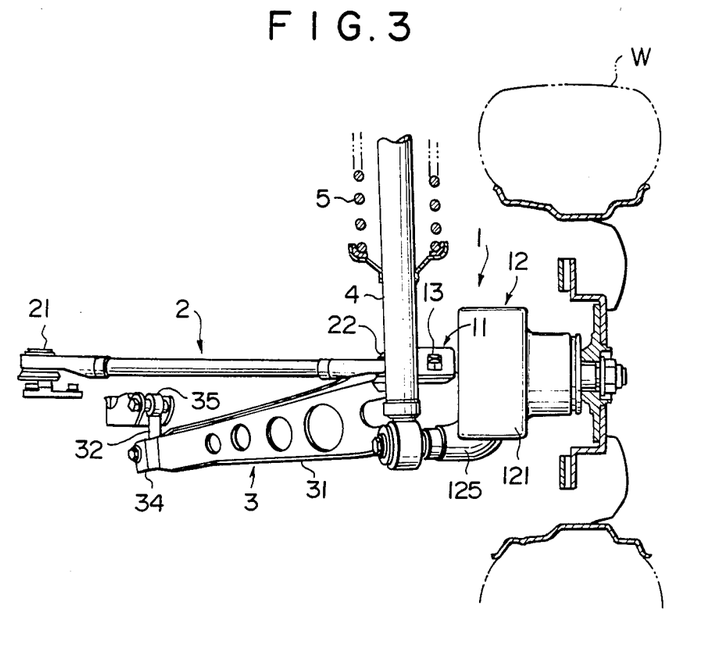
FIG. 3 is an end view of FIG. 1 as viewed from the rear of the vehicle body.
Figure 4:
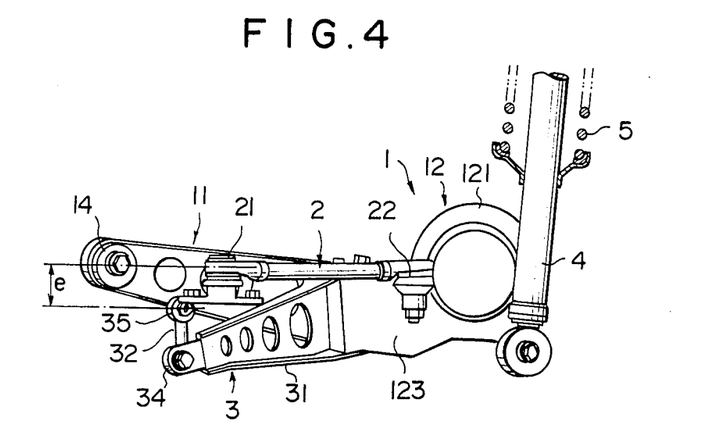
FIG. 4 is a side elevational view of FIG. 1 as viewed from the inner side of the vehicle body.
Figure 5:
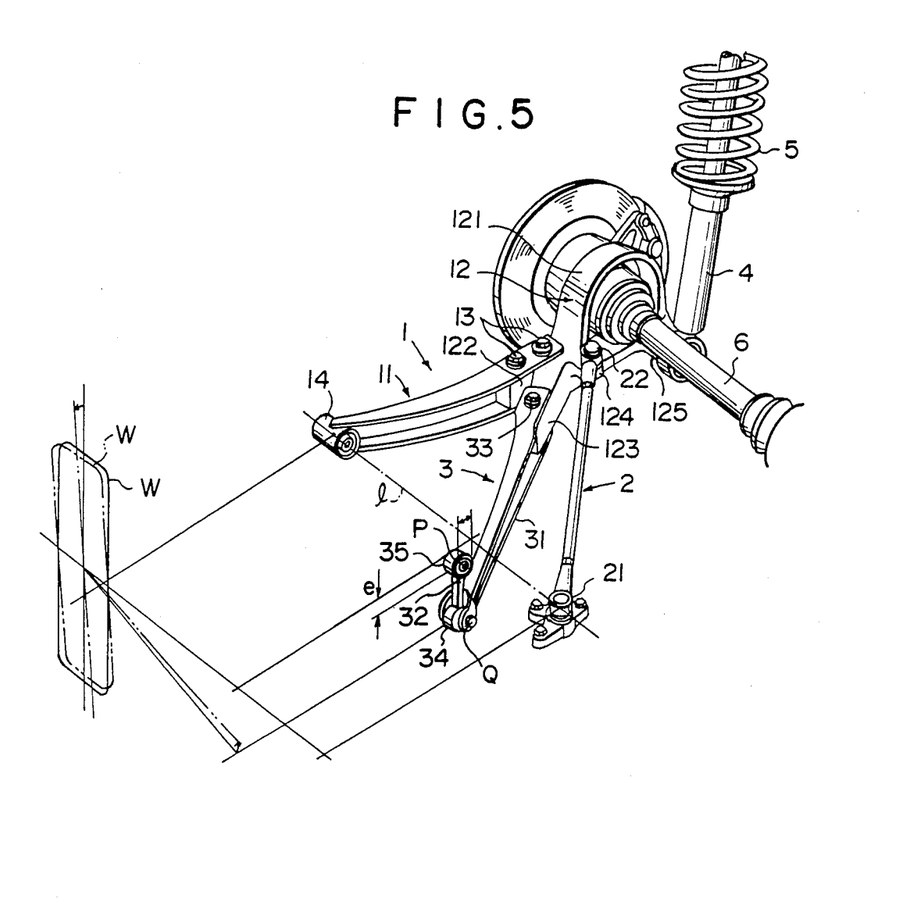
FIG. 5 is a view similar to FIG. 1 but of a semi-trailing arm type rear-suspension system in accordance with another embodiment of the present invention.
Figure 6:
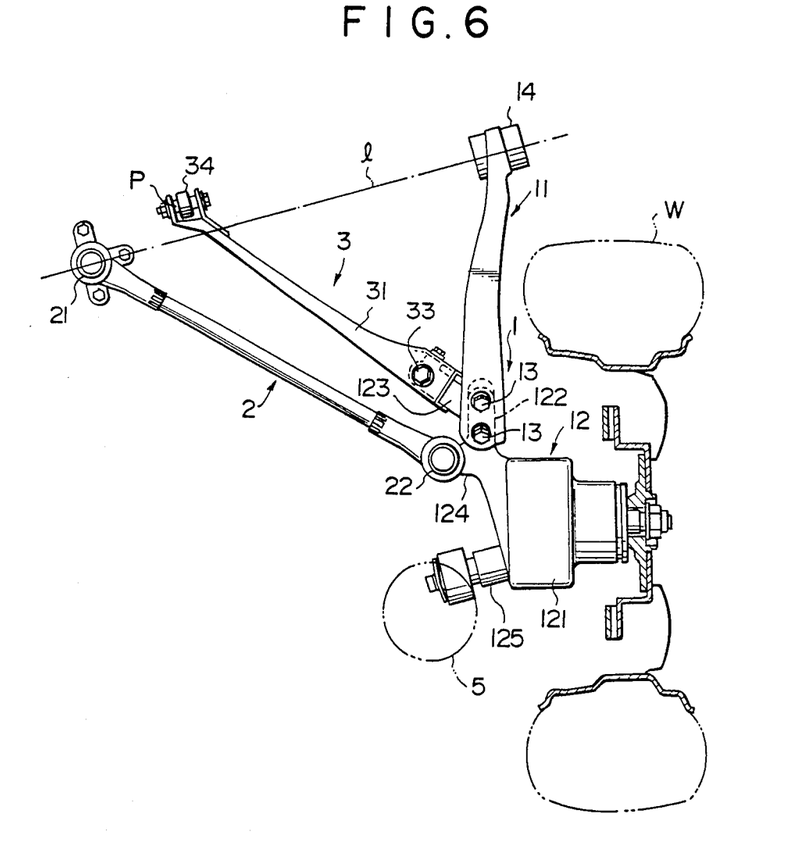
FIG. 6 is a plan view of FIG. 5.
Figure 7:
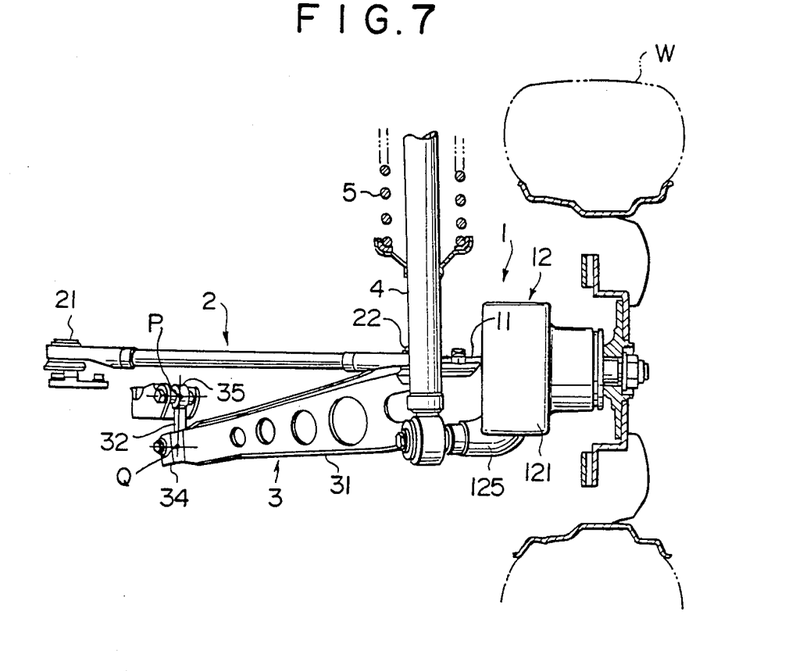
FIG. 7 is an end view of FIG. 5 as viewed from the rear of the vehicle body.
Figure 8:
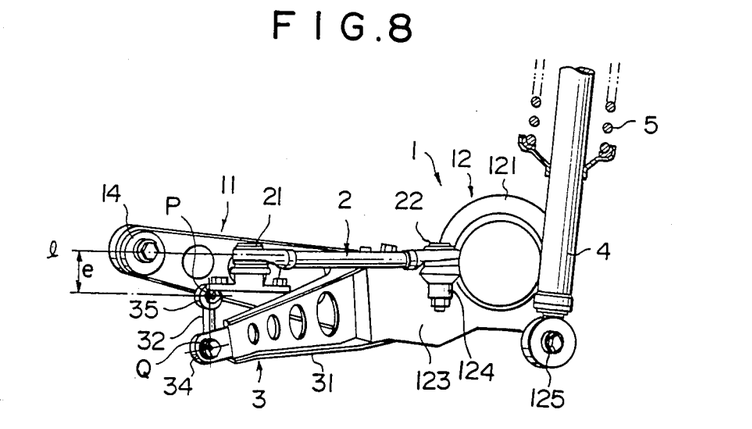
FIG. 8 is a side elevational view of FIG. 5 as viewed from the inner side of the vehicle body.
Figure 9:
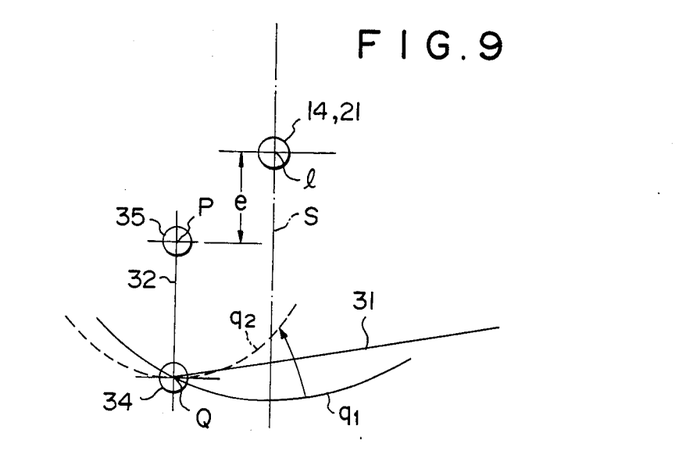
FIG. 9 is a schematic view for illustrating the principle of operation of the rear-suspension system of FIGS. 5 to 8.

As in the embodiment shown in FIGS. 1 to 4, during bump or rebound of the rear wheel W, the rear wheel W vertically pivots with respect to the vehicle body under the guidance of both the semi-trailing arm 1 and the camber control link mechanism 3 comprising the first control link 31 fixed to the semi-trailing arm 1 at one end and the second control link 32 connected to the other end of the first control link 31. Because the second control link 32 is disposed to vertically extend on the forward side (left side as seen in FIG. 9) of the vertical plane including the pivotal axis l of the semi-trailing arm 1 and at the same time the body side pivotal center P thereof (the ball joint 35) is offset from the pivotal axis l of the semi-trailing arm 1 by a preset amount e, the path $q_1$ along which the junction Q between the first and second control links 31 and 32 (ball joint 34) is to move when it pivots about the axis l differs from the path $q_2$ along which the junction Q is to move when it pivots about the body side pivotal center P of the second control link 32 as shown in FIG. 9. This difference between the paths $q_1$ and $q_2$ becomes particularly large during bump when the junction Q is displaced rearwardly. As in the embodiment above, change in the amount of camber during pivotal movements of the semi-trailing arm 1 is controlled by the difference between the paths $q_1$ and $q_2$. That is, the change in the amount of camber of the rear wheel W which would be obtained when the semi-trailing arm 1 pivots freely about the axis l is corrected by virtue of said difference between the paths $q_1$ and $q_2$ under resilient deformation of the resilient bushing 14 at which the semi-trailing arm 1 is mounted on the vehicle body, and the amount of correction depends upon the preset amount e by which the ball joint 35 is offset from the pivotal axis l of the semi-trailing arm 1.

Though in this embodiment, the second control link 32 is connected for pivotal movement to one end of the first control link 31 and the vehicle body respectively at the lower and upper ends, the lower and upper ends of the second control link 32 may instead be respectively connected to the end of the first control link 31 and the vehicle body, provided that the second control link 32 is disposed on the forward side of said vertical plane and the body side pivotal center P thereof is offset from the pivotal axis l of the semi-trailing arm 1.

The present invention is not limited to the above embodiments but various changes and modification can be made. For example, the present invention can be applied also to a semi-trailing arm type rear-suspension in which the semi-trailing arm is connected to the vehicle body at two points, and a full-trailing arm type rear-suspension. In the latter case, negative camber of the rear wheel W can be effectively controlled during cornering.

We claim:

1. A wheel-suspension of a rear wheel of a vehicle comprising a wheel supporting member having a trailing arm and a first control link, wherein said trailing arm at its end directed to the vehicle body is vertically pivotable, being connected to the vehicle body at a body side mounting point by means of a resilient bushing and wherein said first control link at its end directed to said vehicle body is pivotably connected with one end of a second control link, said second control link, at its other end, being pivoted to said vehicle body at a body side pivot center (P), a lateral link, one end of which is pivotably connected to the wheel supporting member and the other end of which is pivotably connected to said vehicle body at a body side mounting point, respectively, whereby the body side pivotal center (P) of said second control link is downwardly offset from the line (l) adjoining the body side mounting point of said trailing arm and the body side mounting point of said lateral link by a predetermined amount (e), said lateral link being connected by means of ball joints to said wheel supporting member and said vehicle body.

2. A rear-suspension system as defined in claim 1 in which said first control link has a first end fixed to the trailing arm near the portion at which said wheel supporting member is supported on the trailing arm, and said one end of the lateral link is connected to the trailing arm near the first end of the first control link.

3. A rear-suspension system as defined in claim 2 in which said first and second control links are disposed between the trailing arm and the lateral link, the second control link is shorter than the first control link and extends vertically, the trailing arm and the lateral link being arranged so that the line (l) joining body side mounting points of said traling arm and said lateral link, respectively, is inclined with respect to the longitudinal axis of the vehicle body.

4. A rear-suspension system as defined in claim 1 in which said first and second control links are disposed between the trailing arm and the lateral link.

5. A rear-suspension system as defined in claim 1 in which said second control link is shorter than the first control link and extends vertically.

6. A rear-suspension system as defined in claim 1, wherein said trailing arm and the lateral link are arranged so that the line joining their respective body side mounting points is inclined with respect to the longitudinal axis of the vehicle body.

7. A rear-suspension system for a vehicle comprising a trailing arm which is connected at one end thereof to a wheel hub for supporting a rear wheel for rotation and to a vehicle body for vertical pivotal movement about a pivotal axis at the other end by way of a resilient bushing, a first control link fixed to the trailing arm at its first end and a second control link which is connected to a second end of the first control link for pivotal movement at one end and to said vehicle body for pivotal movement at the other end, the second control link being disposed to vertically extend on the forward side of a vertical plane including the pivotal axis of the trailing arm and where said second control link has a body side pivotal center wherein the body side pivotal center of the second control link is offset from the pivotal axis of the trailing arm by a preset amount.

8. A rear-suspension system as defined in claim 7 in which said first end of the first control link is fixed to the trailing arm near the portion at which said wheel hub is supported on the trailing arm.

9. A rear-suspension system as defined in claim 7 including a lateral link having (a) one end thereof connected to said trailing arm at said one end thereof and (b) the other end thereof connected to the vehicle body.

10. A rear-suspension system as defined in claim 7 in which said pivotal axis of the trailing arm is inclined with respect to the longitudinal axis of the vehicle body.

11. A rear-suspension system as defined in claim 7 including a lateral link, both ends of which are pivot-connected to the vehicle body and the wheel support member, respectively, via ball-joints.

* * * * *